US010690521B2

(12) United States Patent
Bouffaron et al.

(10) Patent No.: US 10,690,521 B2
(45) Date of Patent: Jun. 23, 2020

(54) NON-ACOUSTIC MEASUREMENT UNIT

(71) Applicant: THALES, Courbevoie (FR)

(72) Inventors: Renaud Bouffaron, Sophia Antipolis (FR); Martine Doisy, Sophia Antipolis (FR); Christian Bergogne, Sophia Antipolis (FR)

(73) Assignee: THALES, Courbevoie (FR)

( * ) Notice: Subject to any disclaimer, the term of this patent is extended or adjusted under 35 U.S.C. 154(b) by 204 days.

(21) Appl. No.: 16/063,188

(22) PCT Filed: Dec. 14, 2016

(86) PCT No.: PCT/EP2016/081053
§ 371 (c)(1),
(2) Date: Jun. 15, 2018

(87) PCT Pub. No.: WO2017/102873
PCT Pub. Date: Jun. 22, 2017

(65) Prior Publication Data
US 2020/0003587 A1   Jan. 2, 2020

(30) Foreign Application Priority Data

Dec. 16, 2015   (FR) .................................... 15 02607

(51) Int. Cl.
*G01D 5/00*   (2006.01)
*G01D 5/26*   (2006.01)
(Continued)

(52) U.S. Cl.
CPC ............. *G01D 5/268* (2013.01); *G01H 9/004* (2013.01); *G01V 1/201* (2013.01); *G01V 1/38* (2013.01);
(Continued)

(58) Field of Classification Search
CPC ........ G01D 5/268; H02S 40/20; G01H 9/004; G01V 1/201; G01V 1/38; H04R 1/44; G08C 23/06
(Continued)

(56) References Cited

U.S. PATENT DOCUMENTS 5,784,337 A   7/1998  Rainey et al.
5,898,517 A   4/1999  Weis
(Continued)

FOREIGN PATENT DOCUMENTS

EP    0 402 185 A1    12/1990
FR    2 974 263 A1    10/2012
WO    2007/056827 A1   5/2007

OTHER PUBLICATIONS

Audo, "Opto-alimentation et transmission de donees par fibre optique pour les observatoires de fond de mer", Jan. 29, 2013 (Jan. 29, 2013), XP055293705.

*Primary Examiner* — Max H Noori
(74) *Attorney, Agent, or Firm* — Baker & Hostetler LLP

(57) ABSTRACT

A non-acoustic measurement unit is provided to be integrated into an all-optical acoustic antenna, the non-acoustic measurement unit including a portion of an optical fiber, termed non-acoustic, intended to convey non-acoustic measurements, at least one non-acoustic sensor with electrical output able to deliver at least one electrical signal representative of at least one physical quantity, and a passive electro-optical transducer subjected to the electrical signal, the passive electro-optical transducer acting on a mechanical constraint undergone by a first sensitive zone of the optical fiber portion, in such a way that a value of a measurable property of a first optical signal conveyed by the non-acoustic optical fiber is representative of the electrical signal, and at least one photovoltaic cell coupled electrically (Continued)

to the non-acoustic sensor so as to electrically supply the sensor.

14 Claims, 4 Drawing Sheets

(51) Int. Cl.
    *H02S 40/20*     (2014.01)
    *G01H 9/00*     (2006.01)
    *G01V 1/20*     (2006.01)
    *G01V 1/38*     (2006.01)
    *H04R 1/44*     (2006.01)
    *G08C 23/06*     (2006.01)

(52) U.S. Cl.
    CPC ............... *H02S 40/20* (2014.12); *H04R 1/44* (2013.01); *G08C 23/06* (2013.01)

(58) Field of Classification Search
    USPC .......................................................... 73/800
    See application file for complete search history.

(56) References Cited

U.S. PATENT DOCUMENTS

| | | | | |
|---|---|---|---|---|
| 2009/0241753 | A1* | 10/2009 | Mann | G10D 17/00 |
| | | | | 84/384 |
| 2014/0354263 | A1* | 12/2014 | Brodzeli | G01R 29/12 |
| | | | | 324/96 |
| 2015/0275161 | A1* | 10/2015 | Gressel | A01G 22/00 |
| | | | | 435/257.3 |
| 2017/0268954 | A1* | 9/2017 | Ocalan | G01M 3/243 |
| 2019/0369281 | A1* | 12/2019 | Pei | G01V 1/09 |
| 2020/0003587 | A1* | 1/2020 | Bouffaron | H04R 1/44 |
| 2020/0056578 | A1* | 2/2020 | Sheldon-Coulson | ........ |
| | | | | H02K 44/085 |

\* cited by examiner

NON-ACOUSTIC MEASUREMENT UNIT

CROSS-REFERENCE TO RELATED APPLICATIONS

This application is a National Stage of International patent application PCT/EP2016/081053, filed on Dec. 14, 2016, which claims priority to foreign French patent application No. FR 1502607, filed on Dec. 16, 2015, the disclosures of which are incorporated by reference in their entirety.

FIELD OF THE INVENTION

The invention relates to the general field of passive sonars of the type comprising an all-optical underwater acoustic reception antenna. The invention pertains more particularly to such a sonar comprising an all-optical acoustic linear antenna. An acoustic linear antenna is conventionally embodied in the form of an elongate object of small diameter with respect to its length integrating several acoustic sensors. This type of antenna is also called a streamer. Such an antenna is intended to be towed by a marine vessel or linked to a land station by means of a very long hauling cable (the length of which may exceed 1 km and reach a few tens of km).

BACKGROUND

A passive sonar furthermore comprises a supply unit, making it possible to produce energy intended to supply the sensors and a processing unit intended to process the measurements arising from the various sensors so as to detect and then optionally identify and locate objects. The supply unit and the processing unit are sited remotely aboard the marine vessel or on a land station. Provision is made for a link between the acoustic antenna and the supply unit as well as the processing unit. When this link is a link comprising solely one or more optical fibers, one speaks of an all-optical acoustic antenna. Stated otherwise, the links used for the transmission of the supply energy from the supply unit to the antenna and for the transmission, to the processing unit, of the information arising from the sensors are optical fibers. These solutions are of small bulk, are cheap and lightweight. They are insensitive to electromagnetic disturbances. They make it possible, on account of the weak energy attenuation in the optical fibers, to read the measurements performed by the sensors at several kilometers, and to do so without any electrical energy source being connected to the sensors.

All-optical acoustic antennas comprise a plurality of fiber optic hydrophones acting on respective sensitive zones of one or more optical fibers. By fiber optic hydrophone is meant a hydrophone comprising an optical fiber which delivers a measurement signal which is an optical signal. This optical signal is conveyed by an optical fiber. A measurable physical property of this optical signal is representative of the acoustic pressure to which the hydrophone is subjected.

Hydrophones are acoustic sensors intended to measure an acoustic pressure also called dynamic pressure, that is to say fast variations of low pressure. The acoustic pressure measured by a hydrophone is typically between 30 and 200 dB reference 1 µPa and varies at frequencies lying between 1 Hz and 100 kHz.

When acoustic sensors are submerged in water they are also subjected to hydrostatic pressure also called static pressure which increases by approximately 10 000 Pa per meter of water. Hydrophones being used at depth, the hydrostatic pressure undergone by a hydrophone is typically greater than 10 000 Pa. In order to make it possible to measure the acoustic pressure, hydrophones filter the hydrostatic pressure, for example by means of an integrated mechanical or bolt-on high-pass filter of the electrical type. Stated otherwise, in order to avoid saturation phenomena and allow the measurement of the acoustic pressure, acoustic sensors do not make it possible to measure the hydrostatic pressure, that is to say a pressure at least equal to 10 000 Pa, otherwise they would not make it possible to measure the acoustic pressure, the difference in amplitude between the acoustic pressure and the static pressure being of the order of 100 000 000 to 1 000 000 000 Pa.

The aim of passive sonars is to detect and to locate objects in the water. This aim is achieved by means of the acoustic reception antenna but the location of objects makes it necessary to integrate into the acoustic antenna, one or more additional non-acoustic sensors such as, for example, at least one heading sensor, at least one accelerometer, at least one temperature sensor and/or at least one static (or immersion) pressure sensor. The measurements arising from these sensors are used for the detection and/or the location of objects in the water. By non-acoustic sensor is meant a sensor configured to measure one or more physical quantities, each measured physical quantity being a measurement other than an acoustic pressure.

Some of these sensors exist in the form of optical fiber sensors. Such sensors deliver an optical signal representative of the quantity to be measured, said optical signal being conveyed by an optical fiber. There exist for example optical fiber temperature sensors and optical fiber static-pressure sensors. Their integration into the streamer is then easy. However, certain non-acoustic sensors, such as for example heading sensors, exist only in the form of sensors with electrical output. By sensor with electrical output is meant a sensor whose sensitive element delivers an electrical signal, such as for example a voltage or an intensity, representative of a measured physical quantity. The integration of this type of sensor into an all-optical measurement system and in particular its integration into an acoustic antenna of streamer type is then complex.

SUMMARY OF THE INVENTION

An aim of the invention is to propose a solution making it possible to integrate a non-acoustic sensor with electrical output into an all-optical measurement system.

U.S. Pat. No. 5,784,337 describes a solution for integrating a non-acoustic sensor with electrical output into an acoustic linear antenna. It consists in coupling the non-acoustic sensor to one and the same electrical data transmission line as that through which the information arising from the hydrophones are uploaded while carrying out a temporal multiplexing. This coupling is carried out by means of an electronic module supplied by this same line. However, this solution is unsuitable for integration into an all-optical measurement system since it involves installing an electrical line dedicated to the return of the information arising from the non-acoustic sensors, this being contrary to the objectives of limitation of cost, weight, bulk and of low energy consumption of the measurement system. Moreover, when one wishes to read at long range from a remote site a low-power electrical signal generated by a sensor with electrical output, it must at the minimum be pre-amplified electrically and if necessary digitized as near as possible to the sensor if one does not wish to degrade the noise level of the sensor thereby involving an additional energy consumption.

Another solution for reading at long range an electrical signal delivered by an electrical sensor, described in the thesis "Opto-alimentation et transmission de données par fibre optique pour les observatoires de fond de mer" [Opto-supply and transmission of data by optical fiber for seabed observatories] by Frédéric Audo, consists in using an optical energy source, for example of laser or light-emitting diode type. This optical energy source is arranged in proximity to the sensor and coupled to the sensor so as to generate an optical signal modulated in intensity or in phase as a function of the electrical signal delivered by the sensor. This optical energy source is coupled to an information return optical fiber which ensures the function of transporting the optical signal to a processing device. However, this solution is incompatible with integration into an all-optical underwater linear acoustic antenna. Indeed, the integration of an optical source into the acoustic antenna makes it necessary to transmit a significant pump energy in the optical fiber extending between the towing ship (or the land station) and the acoustic antenna (or measurement zone). However, in applications of all-optical underwater acoustic linear antenna type, the pump power transmitted through an optical fiber running between the processing device and the acoustic antenna over a distance of possibly as much as a few tens of km must be minimized in order to remain compatible with the acoustic measurement (this power must not exceed 1 to 2 W). Indeed, in this type of application, use is conventionally made of single-mode fibers in which nonlinear effects may appear upwards of powers greater than 1 W. These nonlinear effects disturb the variations in optical signal that are induced by the hydrophones. Moreover, high-power lasers generating a significant pump energy of the order of 5 W are lasers which use the Raman effect and have overly high-intensity noise for acoustic applications. Additionally, high powers do not allow the use of cheap standard optical connectors which withstand these powers for little time.

Another aim of the invention is to alleviate at least one of the aforementioned drawbacks.

For this purpose the subject of the invention is a non-acoustic measurement unit intended to be integrated into an all-optical antenna, termed an acoustic antenna, comprising at least one hydrophone, said non-acoustic measurement unit comprising a portion of an optical fiber, termed non-acoustic, intended to convey non-acoustic measurements, at least one non-acoustic sensor with electrical output able to deliver at least one electrical signal representative of at least one physical quantity, and a passive electro-optical transducer subjected to said electrical signal, said passive electro-optical transducer acting on a mechanical constraint undergone by a first sensitive zone of the optical fiber portion, in such a way that a value of a measurable property of a first optical signal conveyed by the non-acoustic optical fiber is representative of the electrical signal, and at least one photovoltaic cell coupled electrically to said non-acoustic sensor so as to electrically supply said sensor.

The measurement unit furthermore advantageously comprises at least one of the characteristics hereinbelow taken alone or in combination:
  the photovoltaic cell is supplied with optical energy by means of the optical fiber intended to convey non-acoustic measurements, termed non-acoustic optical fiber,
  the photovoltaic cell is supplied with optical energy by means of a pump residue arising from the electro-optical transducer,
  the passive electro-optical transducer is a piezoelectric transducer, the electrical signal is a digital signal,
  the sensor is able to deliver measurements relating to several physical quantities, the electrical signal being a digital frame in which the measurements relating to the various physical quantities are temporally multiplexed,
  at least one non-acoustic sensor with electrical output is a heading sensor.

The invention also pertains to a measurement device intended to be integrated into a sonar, comprising:
  at least one measurement unit as claimed in any one of the preceding claims and the so-called non-acoustic optical fiber intended to convey non-acoustic measurements,
  at least one, so-called acoustic, optical fiber intended to convey acoustic measurements,
  at least one fiber optic hydrophone acting on the mechanical constraint undergone by a sensitive zone of the acoustic optical fiber in such a way that a value of the measurable property of a second optical signal, conveyed by the acoustic optical fiber, is representative of the acoustic pressure measured by said fiber optic hydrophone,
  a main optical fiber coupled optically to acoustic optical fiber and to the non-acoustic optical fiber in such a way that the main optical fiber conveys said first optical signal and said second optical signal, said first optical signal and said second optical signal being conveyed in a multiplexed manner along main optical fiber.

The device advantageously comprises at least one of the characteristics hereinbelow taken alone or in combination:
  the sensitive zones of the optical fiber which is intended to convey acoustic measurements and of the optical fiber which is intended to convey non-acoustic measurements are fiber laser cavities, the measurable property being the wavelength, the first optical signal and the second optical signal being emitted by the sensitive zone of the optical fiber intended to convey non-acoustic measurements and respectively by the sensitive zone of the optical fiber intended to convey acoustic measurements, said sensitive zones being configured in such a way that the wavelengths of the first optical signal and of said second optical signal exhibit different values,
  at least one measurement unit is supplied by the optical fiber intended to convey non-acoustic measurements, on which the transducer of the measurement unit acts,
  at least the photovoltaic cell of at least one unit is supplied by an optical fiber intended to convey acoustic measurements,
  the photovoltaic cell of at least one measurement unit is supplied by a supply optical fiber distinct from the optical fiber intended to convey acoustic measurements and from the optical fiber intended to convey non-acoustic measurements, said supply optical fiber being coupled optically to an optical coupler ensuring a coupling between the main optical fiber and the optical fiber intended to convey acoustic measurements and the optical fiber intended to convey non-acoustic measurements,
  the photovoltaic cell is supplied via the main optical fiber,
  at least one optical fiber intended to convey acoustic measurements is an optical fiber intended to convey non-acoustic measurements, the photovoltaic cell of at least one measurement unit is supplied by means of several so-called supply optical fibers.

The invention also pertains to a measurement system comprising a demultiplexing device comprising at least one optical demultiplexer linked to the main optical fiber receiving said first signal and said second signal and making it possible to isolate the first optical signal and said second optical signal.

BRIEF DESCRIPTION OF THE DRAWINGS

Other characteristics and advantages of the invention will become apparent on reading the detailed description which follows, given by way of nonlimiting example and with reference to the appended drawings in which.

From one figure to the other, the same elements are labeled by the same references.

DETAILED DESCRIPTION

Figure 1:
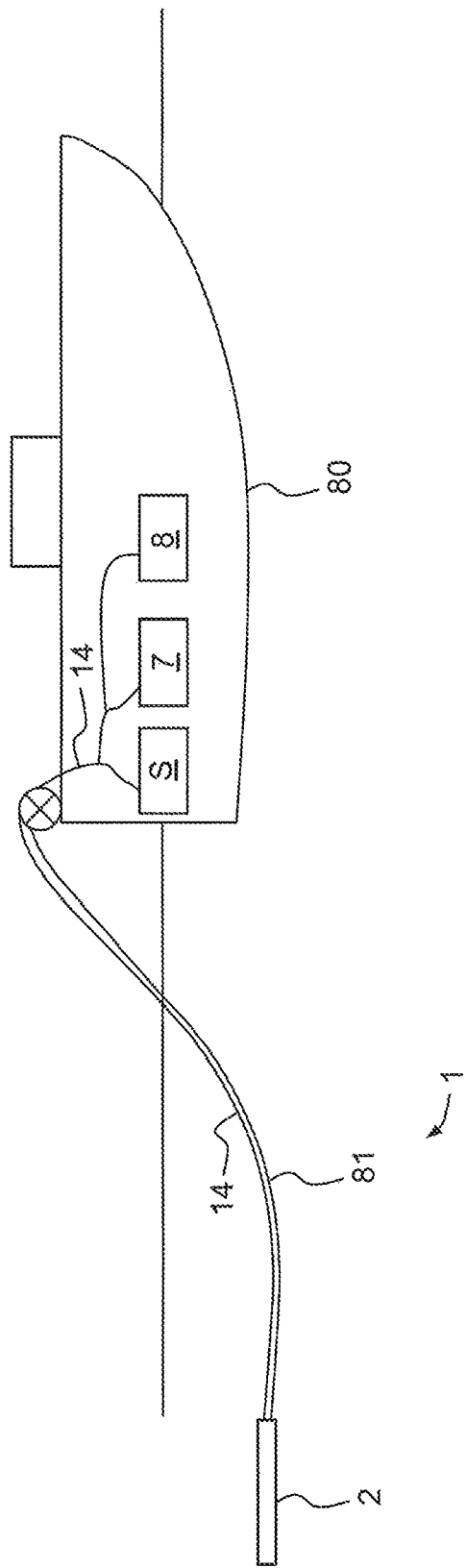
FIG. 1 schematically represents an exemplary sonar comprising an all-optical acoustic streamer antenna towed by a ship, FIG. 2 schematically represents a first example of a measurement system of a sonar according to the invention, FIG. 3 schematically represents a second example of a measurement system of a sonar according to the invention, FIG. 4 schematically represents a third example of a measurement system of a sonar according to the invention.

As represented schematically in FIG. 1, the invention pertains to a sonar. The sonar typically comprises a measurement device comprising a linear antenna 2, termed acoustic antenna hereinafter in the text, an optical source and a reader/receiver. This antenna 2 is towed by a marine vessel 80 such as a ship, by means of a pulling cable 81. This antenna 2 comprises at least one hydrophone and at least one non-acoustic measurement unit. The hydrophones and the non-acoustic measurement unit 5 make it possible to deliver acoustic measurements and respectively non-acoustic measurements in the form of optical signals conveyed by means of a main optical fiber 14 from the antenna 2 to a reader/receiver 7. The main optical fiber 14 comprises a first end linked to the acoustic reception antenna and a second end linked to at least one optical source S and to a reader/receiver 7. The reader/receiver 7 makes it possible to discriminate the acoustic and non-acoustic measurements on the basis of the signals conveyed by the main optical fiber 14. The optical source S makes it possible to generate an optical signal termed an excitation optical signal which may be a pump energy. The optical source S is coupled to the main optical fiber 14 intended to convey said excitation optical signal to the antenna 2. The sonar also comprises a processing unit 8 comprising at least one computer configured to detect and, preferably, to identify and locate objects on the basis of acoustic and non-acoustic measurements arising from the acoustic antenna 2 and identified by the reader/receiver 7.

The optical source S, the reader/receiver 7 and the processing unit 8 are sited remotely. Stated otherwise, these units are outside the acoustic linear antenna 2. They are advantageously installed aboard a marine vessel 80 or on a land station.

Figure 2:
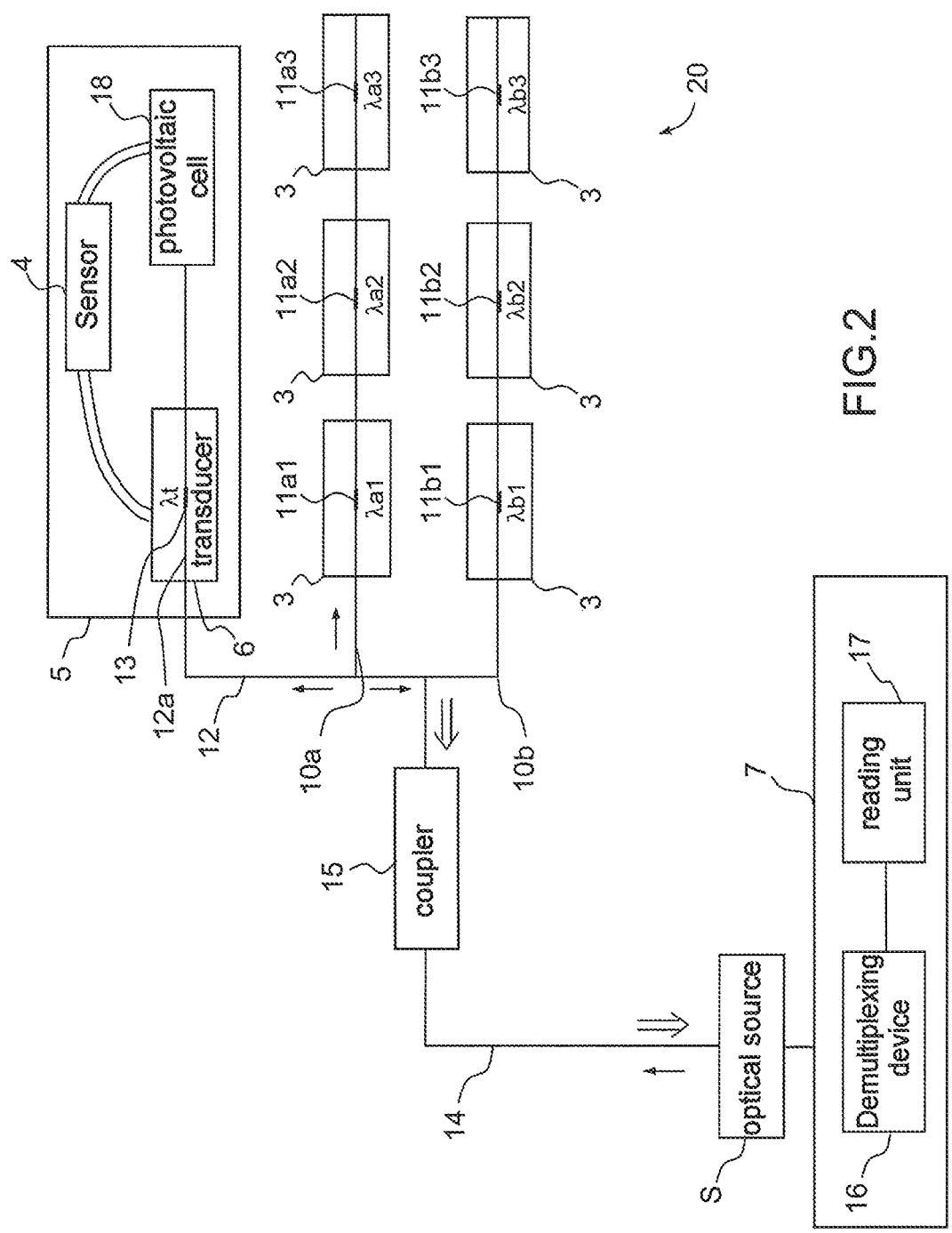
Figure 3:
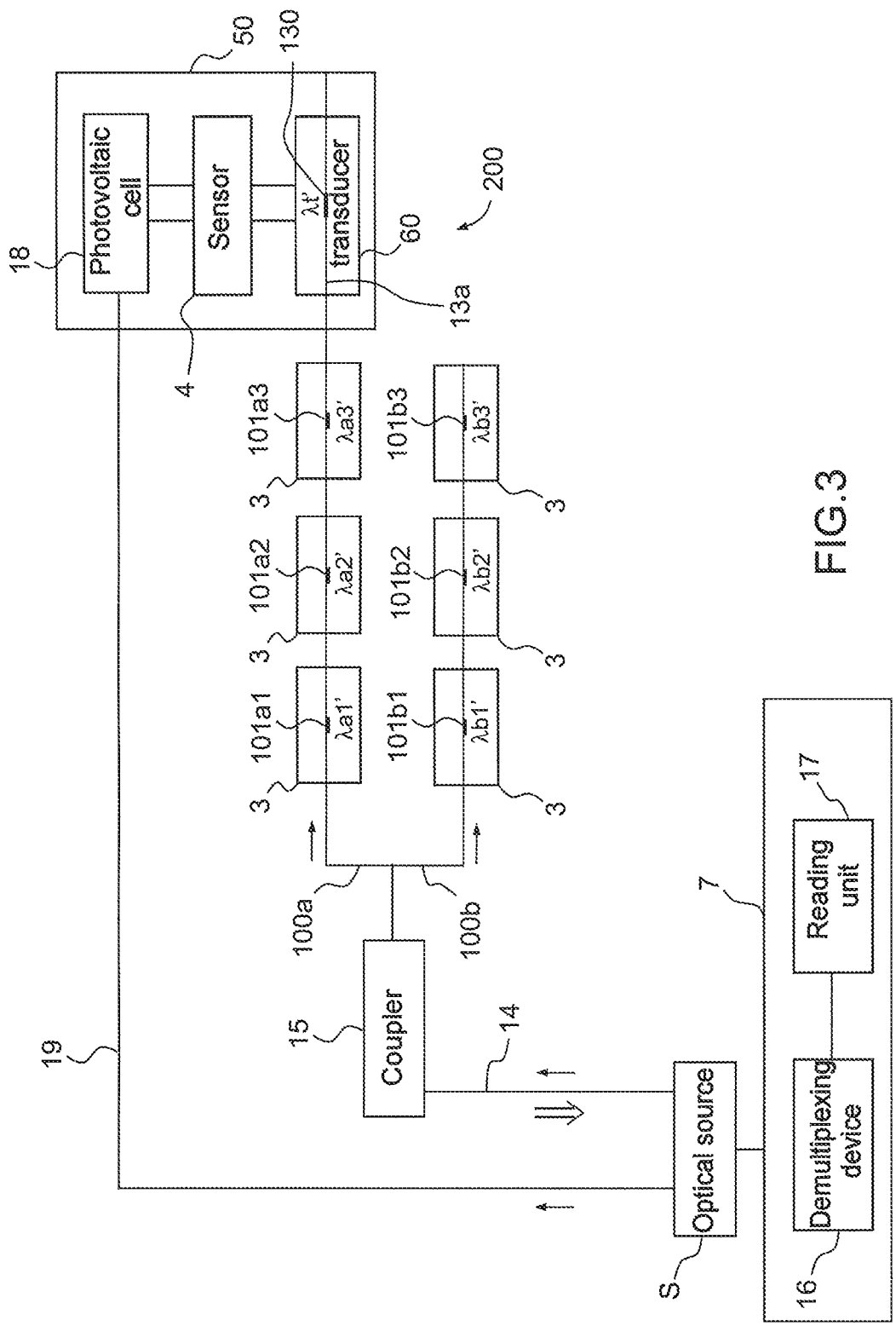

The acoustic antenna 2 takes the form essentially of an elongate pipe of substantially circular cross section comprising an envelope as well as one or more hydrophones and one or more non-acoustic measurement units 5, as is represented in FIGS. 2 and 3, the envelope enclosing the hydrophone or hydrophones and the non-acoustic measurement unit or units. As a variant, the acoustic antenna 2 takes the form essentially of a plate comprising an envelope and the hydrophones and one or more non-acoustic measurement units 5, the envelope enclosing the hydrophone or hydrophones and the non-acoustic measurement unit or units.

As specified previously, the hydrophones 3 are fiber optic hydrophones. In the patent application, the term fiber optic hydrophone is used to refer to a hydrophone acting on a mechanical constraint undergone by a sensitive zone of an optical fiber so as to convert an acoustic pressure to which it is subjected into a corresponding mechanical constraint undergone by the sensitive zone of the optical fiber, the optical fiber conveying an optical signal, a measurable physical property of which exhibits a value representative of said mechanical constraint. The value of the physical property of the optical signal is representative of the acoustic pressure measured by the hydrophone. In other words, such a hydrophone is configured so that the variations of the external acoustic pressure to which it is subjected, translate into variations of a mechanical constraint undergone by the associated sensitive zone, for example a variation of an elongation along the axis of the associated fiber, translating in its turn into variations of a measurable physical property of an optical signal conveyed by the optical fiber. The physical property which varies is for example a phase or a wavelength of an optical signal. The value of the property of the signal is representative of the acoustic pressure measured by the fiber optic hydrophone.

These hydrophones may be so-called all-optical hydrophones of the type comprising an element sensitive to acoustic pressure delivering directly an optical signal representative of the acoustic pressure to which it is subjected. A nonlimiting example of this type of sensor is described in the patent application filed by the applicant and published with the publication number FR2974263. As a variant, these hydrophones may be so-called hybrid hydrophones. A hybrid hydrophone comprises a, preferably passive, element sensitive to acoustic pressure with electrical output, delivering an electrical output signal representative of the external acoustic pressure to which it is subjected. It furthermore comprises an electro-optical transducer acting on a sensitive zone of an optical fiber, and more particularly on a constraint undergone by a sensitive zone, so as to transform the electrical signal into an optical signal conveyed by the optical fiber. The optical signal exhibits a measurable physical property representative of the electrical signal. A nonlimiting example of this type of sensor is described in the patent application filed by the applicant with the publication number WO2007/056827.

In an example, the optical fiber sensitive zones on which the hydrophones act are sensitive zones of the fiber laser cavities type, advantageously Bragg grating fiber lasers, for example of the distributed feedback type, called DFB FL with reference to the expression "distributed feedback fiber laser". Bragg grating fiber laser cavities comprise a Bragg grating inscribed in the sensitive zone of the optical fiber. When a pump energy is injected into the optical fiber by an optical source, the cavity emits an optical signal exhibiting a predetermined wavelength. The wavelength emitted varies as a function of the tension undergone by the sensitive zone along the axis of the fiber, that is to say according to the elongation of the sensitive zone. The mechanical tension or elongation undergone by the sensitive zone is dependent on the external acoustic pressure. The wavelength of the optical signal makes it possible to deduce the external acoustic pressure applied to the sensitive zone. The sensitive zones associated with the respective hydrophones are adjusted on different respective wavelengths in such a way that the signals emitted by the various sensitive zones exhibit different wavelengths. The hydrophones are said to be wavelength multiplexed.

As a variant, the sensitive zone is a standard optical fiber segment. A variation in elongation of the sensitive zone brings about a variation in the phase of an optical signal injected into the optical fiber in the direction of the transducer.

FIG. 2 illustrates more precisely a first example of a measurement system of a sonar intended to deliver acoustic and non-acoustic measurements to the processing unit 8. This measurement system comprises a measurement device 20 intended to deliver acoustic and non-acoustic measurements intended to be used by the processing unit 8 for the detection and location of objects. This measurement device 20 comprises a plurality of fiber optic hydrophones 3 and a main optical fiber 14 making it possible to upload, to the reader/receiver 7, the measurements arising from the hydrophones in optical form.

In the nonlimiting example represented in FIG. 2, the measurement device 20 comprises two optical fibers 10*a*, 10*b*, called acoustic optical fibers hereinafter in the text, intended to convey acoustic measurements delivered not the hydrophones. Stated otherwise, these optical fibers comprise sensitive zones on which fiber laser cavity hydrophones act. The number of hydrophones, represented in the figures, as well as the number of so-called acoustic optical fibers on which they act, are not limiting. The measurement device 20 comprises at least one acoustic optical fiber and at least one hydrophone.

Each acoustic optical fiber 10*a*, 10*b* comprises a plurality of optical fiber sensitive zones 11*ai*, 11*bj*, with i and j=1 to 3, represented by thick dashes in FIG. 2.

We assume hereinafter that in the nonlimiting example of FIG. 2, the optical hydrophones 3 are fiber laser cavity hydrophones. Stated otherwise, they act on sensitive zones 11*ai*, 11*bj* which are fiber laser cavities, for example, with distributed feedback, that are included in the respective acoustic optical fibers 10*a*, 10*b* and spaced along these respective acoustic optical fibers 10*a*, 10*b*. In this example, the hydrophones 3 induce, under the effect of variations of an acoustic pressure to which they are subjected, variations of mechanical constraints which are variations of mechanical tension or of elongation of the respective sensitive zones 11*ai*, 11*bj* along the axes of the respective acoustic optical fibers. These variations of constraints induce variations of the wavelengths λai, λbj of optical signals conveyed by the acoustic optical fibers 10*a*, 10*b* which are signals emitted by the respective sensitive zones 11*ai*, 11*bj*. Indeed, each sensitive zone 11*ai*, 11*bj* emits, under the effect of a pump signal, an optical signal whose wavelength is representative of the elongation that it undergoes and consequently of the acoustic pressures measured by the respective hydrophones.

The main optical fiber 14 is coupled to the acoustic optical fibers 10*a* and 10*b* by means of an optical coupler 15. The main optical fiber 14 is connected at the input of the optical coupler and the acoustic optical fibers are connected at the output of the optical coupler. A function of the optical coupler 15 is to divide the power of the excitation optical signal conveyed by the main optical fiber 14 connected at the input of the optical coupler 15 into a plurality of parts of the excitation optical signal injected onto optical fibers connected at the output of the optical coupler. The coupler therefore makes it possible to divide the power of the excitation optical signal conveyed on the main optical fiber 14 so as to inject portions of this power onto a plurality of optical fibers connected at the output of the coupler. A function of the optical coupler 15 is also, in the direction of the double arrow, to combine the optical signals arising from the optical fibers connected at the output of the optical coupler into a single so-called return optical signal conveyed by the main optical fiber 14. The return optical signal conveys the characteristics of the optical signals arising from the hydrophones acting on the optical fibers connected at the output of the coupler.

The measurements arising from the hydrophones are conveyed by the main optical fiber 14 in a multiplexed (here wavelength multiplexed) format. They are transmitted to the reader/receiver 7 in a multiplexed format via the main optical fiber 14. Thus the physical properties of the respective signals are individually observable by analysis of the properties of the optical signals conveyed by the main optical fiber 14.

This makes it possible to discriminate the signals on which the various hydrophones act and to deduce therefrom the acoustic measurements arising from the respective hydrophones on the basis of the values of the physical property of the optical signals on which the respective hydrophones act.

An aim of the invention is to integrate acoustic sensors with electrical output into an all-optical architecture of the type of that described with no intake of electricity and without modifying this architecture.

For this purpose, the measurement device 20 also comprises a non-acoustic measurement unit 5 according to the invention comprising at least one non-acoustic sensor with electrical output 4 intended to deliver an electrical signal representative of at least one physical quantity to be measured.

The non-acoustic electrical sensor can be an individual sensor which may, in a nonlimiting manner, be a heading sensor making it possible to measure a heading (along at least one axis preferably along three axes), a temperature sensor making it possible to measure a temperature, an immersion sensor making it possible to measure an immersion, and/or an accelerometer (making it possible to measure accelerations along at least one axis preferably along three axes). A heading sensor is an apparatus which detects an angle with respect to a predetermined direction fixed with respect to a landmark.

According to the invention, each non-acoustic measurement unit 5 furthermore comprises a passive electro-optical transducer 6 electrically connected to the non-acoustic sensor 4 so as to be electrically supplied by means of the electrical signal delivered by the sensor. It also comprises a portion 12*a* of an optical fiber 12, called non-acoustic optical fiber hereinafter in the text, intended to convey non-acoustic measurements. The portion 12*a* comprises a sensitive zone 13 on which the transducer 6 acts. More precisely, the transducer 6 is coupled to a sensitive zone 13 of the portion 12*a* of the non-acoustic optical fiber so that when the transducer is subjected to the electrical output signal of the acoustic sensor, it acts on a mechanical constraint undergone by the sensitive zone 13 so as to convert a physical quantity measured by the non-acoustic sensor 4 into a corresponding constraint undergone by the sensitive zone 13 of the portion 12*a* of the non-acoustic optical fiber 12 whose value is representative of the electrical signal. The non-acoustic optical fiber 12 then conveys an optical signal exhibiting in particular a measurable physical property, for example a phase or a wavelength, whose value is representative of the value of the mechanical constraint that it undergoes. The value of the measurable physical property of this optical signal is consequently representative of the value of the physical quantity measured by the sensor. In other words, such a transducer 6 is configured so that the variations of a physical quantity to which it is subjected translate into variations of the constraint undergone by the associated other sensitive zone 13, for example a variation of a mechanical tension bringing about a variation in elongation along the axis of the associated fiber, being translated in their turn into variations of the value of the measurable physical property of an optical signal conveyed by the optical fiber. The transducer 6 acts on one and the same optical fiber constraint as the hydrophones. This constraint acts on one and the same physical property of the optical signal as the hydrophones. Here, it is the wavelength $\lambda t$. Accordingly the sensitive zones coupled to the hydrophones 3 and those coupled to the sensor 4 are based on the same technology. If the sensitive zones coupled to the hydrophones are optical fiber laser cavities inscribed in the first optical fibers, the sensitive zone coupled to the sensor 4 is an optical fiber laser cavity inscribed in the non-acoustic optical fiber. If the sensitive zones coupled to the hydrophones are standard segments of optical fiber, the sensitive zone coupled to the sensor 4 also.

By passive electro-optical transducer 6 is meant an electro-optical transducer which does not require any electrical energy other than that of the signal of the sensor 4 in order to transform the electrical signal into a mechanical constraint or elongation or variation of elongation of the sensitive zone 13 representative of the electrical signal. This configuration is very advantageous since it does not require any exterior energy to transform the electrical output signal of the non-acoustic sensor into an optical signal. It is therefore compatible with the acoustic reception antenna applications and with conventional optical connectors. Nor does it require any additional electrical energy source or electrical wiring to ensure this transformation.

The transformation of the mechanical constraint undergone by the sensitive zone of the non-acoustic optical fiber coupled to the sensor 4 into a corresponding optical signal as well as the transport of this optical signal do not require any dedicated energy source. Only a relatively low pump power (of the order of a few mW) injected at long range into the non-acoustic optical fiber in the direction of the transponder is necessary. Moreover, the output information from the non-acoustic sensor being conveyed by an optical fiber, it can be transmitted at long range without appreciable intake of energy. The transmission of the information by optical fiber does not generate any noise.

The non-acoustic measurement unit 5 comprises also and at least one photovoltaic cell 18 coupled electrically to said sensor 4 so as to electrically supply said sensor 4. The supply of the sensor 4 does not therefore require any electrical link between the non-acoustic measurement unit 5 and the marine vessel 80, the photovoltaic cell 18 being able to be supplied by means of optical energy conveyed by an optical fiber. As a variant, the measurement unit does not comprise any photovoltaic cell.

The photovoltaic cell is, for example, a photovoltaic diode.

The non-acoustic measurement unit 5 according to the invention exhibits the advantage of being able to be integrated into the all-optical acoustic architecture described previously, comprising the transducers and optical fibers to convey the signals arising from the transducers to the reader/receiver 7, with no modification of this architecture and in particular with no extra electrical link for uploading the non-acoustic measurements arising from the sensor 4 to the marine vessel 80. Indeed, the non-acoustic measurements are transformed into optical signals exhibiting a measurable physical property representative of the non-acoustic measurement. It is possible to upload this information on the main optical fiber 14 by optically coupling the portion of the non-acoustic optical fiber 12 of the non-acoustic measurement unit 5 to the main optical fiber 14. Moreover this measurement can be isolated and differentiated from the measurements arising from the hydrophones by simple multiplexing.

FIG. 2 represents an example of integrating the non-acoustic measurement unit 5 according to the invention into an all-optical measurement device 20 according to the invention.

The main optical fiber 14 is coupled to the non-acoustic optical fiber 12 by means of the optical coupler 15. The non-acoustic optical fiber 12 is connected at the output of the optical coupler 15.

In the nonlimiting example represented in FIG. 2, the measurement device 20 comprises a non-acoustic measurement unit 5 but it can comprise several of them. The non-acoustic measurement unit(s) can be coupled to one or more non-acoustic optical fibers 12.

Advantageously, the measurements arising from the respective hydrophones and from the non-acoustic measurement unit 5 are conveyed by the main optical fiber 14 in a multiplexed (wavelength multiplexed) format. They are transmitted to the processing unit 7 in a multiplexed format via the main optical fiber 14. This is also the case when the measurement device 20 comprises several non-acoustic measurement units 5. Stated otherwise the signals on which the respective sensors of the measurement device 20 (hydrophones, non-acoustic sensors) act are multiplexed in such a way that the physical properties carried by the respective signals are observable individually by analysis of the values of the property of the optical signals guided by the main optical fiber 14. For this purpose, the sensitive zones on which the sensors and the respective transducer(s) act are associated with fiber laser cavities adjusted to different respective wavelengths $\lambda ai$, $\lambda bj$ (i=1 to 3 and j=1 to 3 in the nonlimiting example of FIG. 2), $\lambda t$ in such a way that the signals on which the hydrophones and the respective measurement unit(s) act exhibit different respective wavelengths.

This makes it possible to discriminate the signals acted on by the various hydrophones and of the measurement unit 5 or respective measurement units. More precisely, this allows the reader/receiver 7 to isolate the optical signals arising from the respective hydrophones 3 and from each non-acoustic measurement unit 5 and to deduce therefrom the respective associated measurements on the basis of the values of the measurable physical property of these signals. Stated otherwise, the invention proposes to photo-interrogate the non-acoustic measurement unit 5 through the same interrogation channel (main optical fiber) as the hydrophones, that is to say with information return on the same optical fiber and by using the same processing device.

The transport and the optical readout of the information arising from the sensor do not generate any electromagnetic disturbances. This makes it possible to guarantee optimal operation of the sensors and in particular of the heading sensors whose measurements may be disturbed by nearby electromagnetic fields.

The proposed solution is compact, lightweight and cheap. It makes it possible to integrate the sensor into a linear acoustic antenna of small diameter and of low density close to that of the water.

In the embodiment of FIG. 2, the transducer 6 acts on portion 12a of a non-acoustic optical fiber 12 distinct from the acoustic optical fibers 10a, 10b.

The example represented in FIG. 3 differs from the example represented in FIG. 2 in that the so-called non-acoustic optical fiber is a so-called acoustic optical fiber. Stated otherwise, the optical fiber 100a, intended to convey the non-acoustic measurements, which comprises a sensitive zone 130 coupled to a transducer also comprises sensitive zones 101a1, 101a2, 101a3 coupled to hydrophones 3 and is therefore intended to convey acoustic measurements. The acoustic antenna 2 comprises, in a nonlimiting manner, two acoustic optical fibers 100a, 100b to which hydrophones 3 are coupled. The measurement device 200 comprises a measurement unit 50 comprising a non-acoustic sensor with electrical output 4 and a transducer 60. The transducer 60 acts on a sensitive zone 130 of a portion 13a of an acoustic optical fiber 100a. This sensitive zone 130 is distinct from the sensitive zones 101ai, 101bj acted on by the hydrophones which are coupled to the acoustic optical fiber in question 100a. The respective sensitive zones are associated with fiber laser cavities adjusted to respective wavelengths λai', λbj' (i'=1 to 3 and j'=1 to 3 in the nonlimiting example of FIG. 3), λt' in such a way that the signals acted on by the respective hydrophones and measurement unit exhibit different respective wavelengths. This solution does not require any dedicated optical fiber for the transport of the information arising from the sensor or dedicated wiring or dedicated electrical energy source.

It is also possible to envisage an embodiment in which the measurement device comprises a single optical fiber, the main optical fiber. The main optical fiber is at one and the same time a so-called acoustic optical fiber and a so-called non-acoustic optical fiber.

In the embodiment of FIG. 3, the sensitive zone 130 on which the transducer 60 acts is situated downstream of the sensitive zones 101ai associated with the hydrophones 3 coupled to the same optical fiber 100a as the transducer 60 on the path of the part, guided by this fiber 100a, of the pump beam, represented by the single arrow extending along this fiber 100a. Stated otherwise, the transducer 60 receives a pump residue arising from the hydrophones 3 coupled to the same acoustic optical fiber 100a. This arrangement is not limiting. The sensitive zone 130 could for example extend upstream of the sensitive zones on which the hydrophones act or between two hydrophones.

The electrical sensor 4 comprises an electrical supply input to which the photovoltaic cell 18 is connected and an output by which it delivers an electrical signal, this output being hooked up to the transducer 6 or 60 so as to electrically supply the electro-optical transducer by means of the electrical signal delivered by the sensor.

In the embodiment of FIG. 3, the photovoltaic cell 18 is coupled to an optical fiber 19, called a supply optical fiber, so as to be supplied with optical energy by means of an optical signal conveyed by the optical fiber 19. This signal also advantageously enables the photovoltaic cell 18 to be given the power enabling the production of the supply voltage for the sensor 4.

The supply optical fiber 19 ensures the transport of optical energy between the optical source S and the photovoltaic cell 18. This type of supply is compact, lightweight and fairly inexpensive and enables, on account of the low energy losses in an optical fiber, the sensor to be sited more remotely with respect to the source S.

In the embodiment of FIG. 3, the supply optical fiber 19 is an optical fiber dedicated to supplying the photovoltaic cell with optical energy. It is distinct from the acoustic and non-acoustic optical fibers. The supply of the sensor 4 therefore requires an additional optical fiber extending from the other optical source S to the photovoltaic cell 18.

In the embodiment of FIG. 2, the supply optical fiber making it possible to supply the photovoltaic cell 18 is the non-acoustic optical fiber 12 on which the transducer 6 acts. Stated otherwise, the sensor 4 is supplied electrically by means of a photovoltaic cell 18 supplied with optical energy by means of the non-acoustic optical fiber 12. The photovoltaic cell is coupled to the portion 12a of the optical fiber included in the unit 5. More precisely, the photovoltaic cell 18 and the transducer 6 are arranged along the same non-acoustic optical fiber 12 in such a way that the photovoltaic cell is supplied by a pump (or more generally excitation) light residue exiting the sensitive zone 13 on which the transducer 6 acts. Stated otherwise, the sensitive zone 13 on which the transducer 6 associated with the sensor 4 acts is interposed between the photovoltaic cell 18 and the coupler 15, or more generally between the optical source S and the coupler 15, in the direction of guidance of the signal arising from the source S and represented by single arrows. The electrical information arising from the sensor is returned in the reverse direction via the transducer 6 in the form of an optical signal. This configuration uses the property of the transducer which needs a supply of optical energy in order for population inversion to take place in its active region but which taps off low optical power. The transit losses are typically 0.4 dB i.e. less than 5% on account of the characteristics of the optical fiber laser cavities. The pump residue, at the output of the transponder, can therefore be advantageously used for the supply of the photovoltaic cell. This solution is compact and lightweight. Indeed, one and the same optical fiber is used for the photo-supply of the photovoltaic cell and the return of the measurements. It is not necessary to dedicate an optical fiber linking the photovoltaic cell to a remotely sited supply source. However, it should be mentioned that an acoustic antenna typically comprises a plurality of measurement devices 20, 200, such as are represented in FIG. 2 or FIG. 3, each detection module being linked to a remotely sited optical source S by means of a dedicated main optical fiber, which may measure several hundred meters, and comprises at least one non-acoustic electrical sensor. The fact that provision is made for each non-acoustic electrical sensor to be supplied such as represented in FIG. 2 rather than such as represented in FIG. 3 therefore allows a saving of not one but a plurality of supply optical fibers (one for each measurement device 20, 200). This saving of fibers has a positive impact on a complete system since it allows the use of a cable of smaller diameter to house the optical fibers linked to a plurality of measurement devices. For the same reasons, this saving of fibers makes it possible to use on this cable optical connectors (often indispensable to a complete system) which contain fewer optical contacts and which therefore are more compact physically.

As a variant, a second optical source emitting a second pump beam is coupled to the supply optical fiber, in place of the source S, so as to inject the second pump beam thereinto so that the supply optical fiber ensures the guidance of the second pump beam. As a variant, the supply optical fiber could be a so-called acoustic optical fiber, that is to say coupled to at least one hydrophone so as to be intended to convey acoustic measurements. The photovoltaic cell and the hydrophones coupled to this acoustic optical fiber would be arranged along the so-called non-acoustic optical fiber 12 in such a way that the photovoltaic cell is supplied by a pump (or more generally excitation) light residue exiting the sensitive zone on which each hydrophone coupled to this acoustic optical fiber acts. This solution exhibits the same advantages in terms of compactness as when the supply optical fiber is a non-acoustic optical fiber. This so-called acoustic optical fiber can also be a non-acoustic optical fiber, that is to say coupled to a transducer coupled to a non-acoustic sensor.

Figure 4:
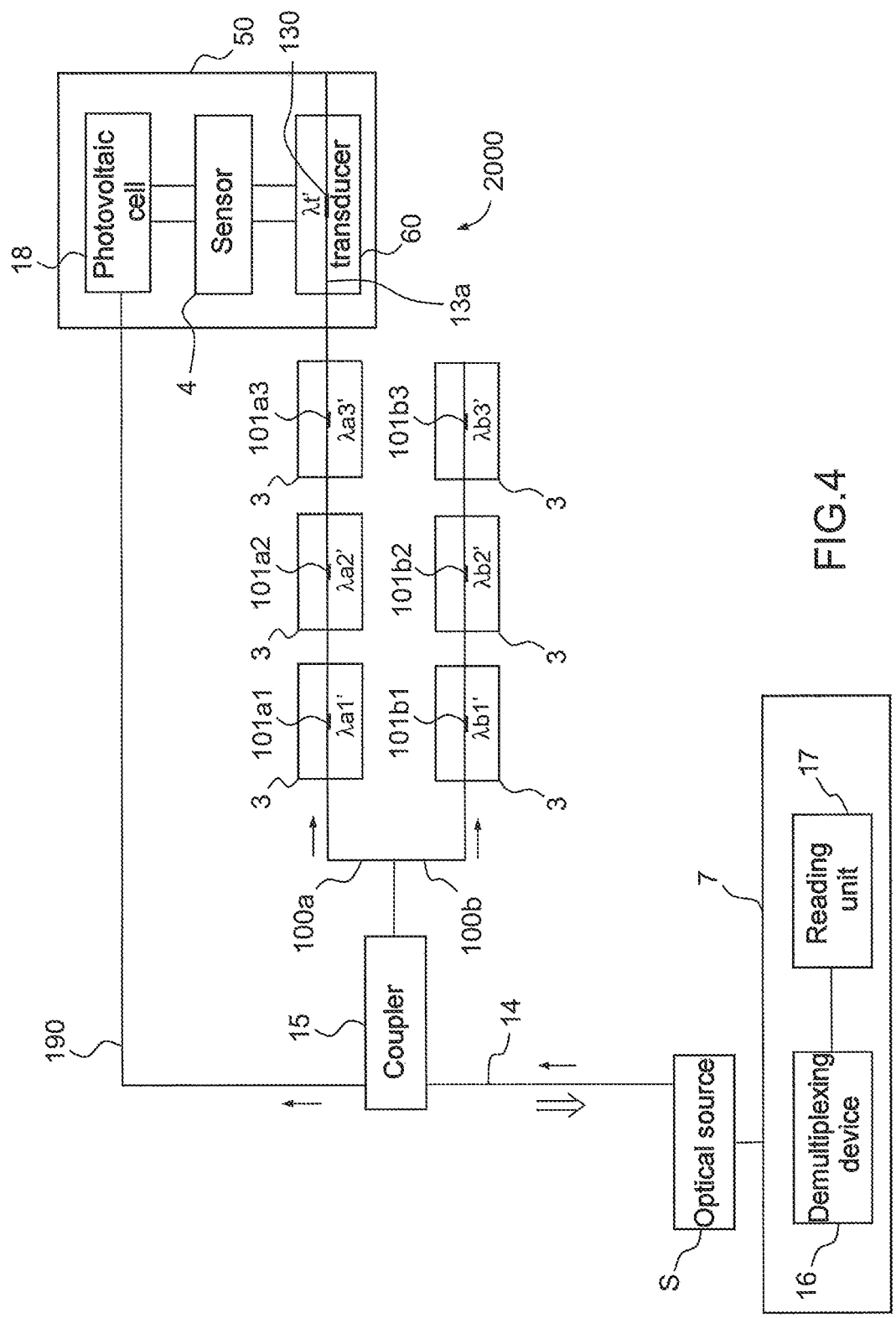

As a variant, the supply optical fiber is a so-called acoustic optical fiber distinct from the so-called non-acoustic optical fiber or fibers or an optical fiber distinct from the acoustic and non-acoustic fiber or fibers and connected at the output of the optical coupler 15. The latter has been represented in FIG. 4. The measurement device 2000 of FIG. 4 differs from that of FIG. 3 solely by the supply of the photovoltaic cell 18. The latter is supplied by means of a supply optical fiber 190 coupled to the coupler 15 so as to be supplied by means of the optical fiber 14.

The solution in which the supply optical fiber is connected to the coupler exhibits the same advantages in terms of compactness as when the supply optical fiber is a non-acoustic optical fiber.

Generally, the advantage in compactness terms is obtained when a supply optical fiber is supplied via the main optical fiber 14.

In another variant, the photovoltaic cell 18 can be common to several non-acoustic measurement units 5 or 50. Stated otherwise the photovoltaic cell supplies several non-acoustic sensors 4. In the case where the photovoltaic cell 18 is supplied by means of a supply optical fiber which is a non-acoustic optical fiber on which at least one of the non-acoustic measurement units supplied by the photovoltaic cell acts, the transducer of each of these non-acoustic measurement units is then interposed between the photovoltaic cell and the coupler 15 or more generally between the photovoltaic cell and the optical source S in the direction of guidance of the excitation luminous signal.

As a variant, the measurement unit comprises several photovoltaic cells coupled to different respective supply optical fibers. The photovoltaic cells deliver respective electrical energies added together by means of a summator, the sensor being supplied electrically by means of the sum of the electrical energies.

In each variant, each photovoltaic cell can be coupled optically to several supply optical fibers so as to be supplied with optical energy by means of several supply optical fibers. These fibers can comprise one or more acoustic fibers and/or one or more non-acoustic fibers and/or one or more fibers distinct from the acoustic and non-acoustic fibers. In this case the polarization of the optical signals delivered by the various optical fibers to which the photovoltaic cell is coupled is advantageously controlled by means of polarization controllers before their energies are added together by means of an optical summator. The sum of the optical energies supplies the photovoltaic cell with optical energy. For example the photovoltaic cell is coupled to several acoustic optical fibers downstream of the hydrophones in the direction of the path of the excitation luminous signal so as to be supplied by means of the pump residues arising from the hydrophones coupled to these acoustic optical fibers. This makes it possible to correctly supply the photovoltaic cell and the sensor if the pump residues arising from the respective acoustic optical fibers is insufficient.

Advantageously, the sensor 4 is a weak energy consumer. It advantageously consumes energy of less than a few tens of mW. This makes it possible to preserve an all-optical architecture with no risk of supply defect. Sensors of MEMS type make it possible to achieve this type of electrical energy consumption.

Advantageously, the electro-optical transducer 6 is a passive piezoelectric transducer which transforms a variation in electrical signal (sensor output signal) by means of which it is electrically supplied into a variation in mechanical constraint undergone by the second sensitive zone 13 through the piezoelectric effect. The mechanical constraint, for example the tension of the sensitive zone, is representative of the electrical signal. This type of transducer enables an electrical signal to be transformed with high sensitivity into a second optical signal. Several examples of electro-optical transducers of this type are described in the patent application filed by the applicant with the publication number WO2007/056827. In this example, the sensitive zones coupled to the transducers are fiber laser cavities.

Generally, in an electro-optical transducer of the piezoelectric type, each acoustic transducer comprises one or more piezoelectric element(s). Each piezoelectric element is coupled electrically to the non-acoustic sensor with electrical output so as to be supplied electrically by means of the electrical signal delivered by the sensor. The piezoelectric element is coupled mechanically to a sensitive zone of an optical fiber in such a way that its deformation, under the effect of a variation of the electrical signal, generates a variation of the constraint undergone by the second sensitive zone, for example of the elongation of the second sensitive zone which is representative of the electrical signal.

The piezoelectric element can, in a nonlimiting manner, be a monocrystalline or ceramic piezoelectric bar, or a bimorph bar or plate (consisting of a layer of piezoelectric material and of a layer of metal). The piezoelectric element can be intended to deform essentially by bending or else essentially by elongation along a predetermined axis in the direction of its length under the effect of a variation of the electric field. The piezoelectric element can be coupled electro-mechanically, that is to say be advantageously intended to vibrate in mode 31 or 32 (transverse) under the effect of a variation of the electrical signal. This makes it possible to obtain simple piezoelectric elements exhibiting good electro-optical sensitivity and significant capacity. This type of transducer makes it possible in particular to transform, into an optical signal, a weak electrical signal (typically equal to a few nW). As a variant, the piezoelectric element is coupled electro-mechanically in longitudinal mode (mode 33).

According to the invention, as visible in FIG. 2, the main optical fiber 14 is coupled to the optical source S which is configured to emit an excitation optical signal in the direction of the single arrow toward the hydrophones 3 and the measurement unit 5. In the case where sensitive zones of optical fiber laser cavity type are used, the excitation optical signal is a pump beam intended to ensure population inversion in the sensitive zones of the first and second optical fibers. Advantageously, the optical power injected into the main optical fiber 14 by the optical source S is chosen so as to avoid the nonlinear effects within the first optical fibers to which the hydrophones are coupled. It is typically chosen so as to inject a power of about 1 W into the first optical fibers for an acoustic optical fiber exhibiting a length of several kilometers. This makes it possible to avoid disturbing hydrophone operation related to nonlinear effects appearing at higher powers.

The reader/receiver 7 comprises a demultiplexing device 16 comprising at least one optical demultiplexer. The optical demultiplexer receives the optical signals transported by the main optical fiber 14 and isolates these various optical signals. Stated otherwise, the demultiplexing device makes it possible to discriminate the respective signals on which the hydrophones and each measurement unit 5 act.

The reader/receiver 7 comprises a reader 17 making it possible to measure the values of the characteristics of the optical signals arising from the respective hydrophones and the measurement unit 5 (or the respective measurement units) and to deduce therefrom the respective measurements of acoustic pressure and the measurement of physical quantity or the respective measurements of physical quantity.

Advantageously, the reader 17 comprises at least one optoelectronic transducer, for example at least one photodiode, making it possible to transform the respective optical signals conveyed by the optical fiber into return electrical signals. It advantageously comprises at least one computer making it possible to deduce the characteristics and other respective characteristics of these return electrical signals and to deduce therefrom the associated respective measurements.

The demultiplexing device 16 can comprise at least one temporal multiplexer and/or at least one frequency (wavelength) multiplexer. As the hydrophones 3 and each measurement unit 5 act on the same physical property or characteristic of optical signals conveyed by the optical fiber, the same type of multiplexing and of demultiplexing, for example temporal and/or frequency, is used to extract the information arising from the various hydrophones 3 and from each measurement unit 5. This makes it possible not to have to modify the interrogation channel used by the hydrophones during the integration of the sensor.

In the case of frequency multiplexing, the demultiplexing device comprises a wavelength demultiplexer making it possible to isolate all these signals. This embodiment is particularly advantageous since the multiplexing of the signals is inherent to the structure of the fibers. It does not require any energy.

As a variant, the acoustic and non-acoustic optical fibers are configured in such a way that the variation of the elongation of each sensitive zone of these fibers causes the phase of an optical signal to vary, advantageously of the portions of the excitation signal that are conveyed by these respective fibers. The measurement device 20 then advantageously comprises a temporal multiplexer making it possible to multiplex these portions of excitation signals in a temporal manner. The temporal multiplexer is advantageously installed aboard the ship or on a land station. The first signals and the second signal are therefore transmitted to the processing unit in a time-shifted manner. The demultiplexing device then comprises a temporal demultiplexer receiving the signals conveyed by the main optical fiber and making it possible to isolate the signals on which the respective hydrophones 3 and measurement units 5 act.

Each hydrophone 3 can comprise a single sensitive element. As a variant when the hydrophone is a so-called "hybrid" hydrophone, it can comprise several sensitive elements connected in series and/or in parallel to a single transducer or connected to the same transducer in such a way that the measurements arising from the respective sensitive elements are transmitted to an acoustic fiber via the transducer in a temporally multiplexed format. Each non-acoustic sensor 4 can be configured to measure one or more physical quantities (for example the heading along one or more axes). The sensor is therefore able to deliver different electrical signals representative of the respective physical quantities. In the second case, the measurement unit advantageously comprises a temporal multiplexer making it possible to apply to the transducer the electrical signals representative of the respective physical quantities in a temporally multiplexed format. These signals advantageously form a digital frame. The demultiplexing device then advantageously comprises a temporal demultiplexer making it possible to separate the other electrical signals representative of the respective physical quantities.

Each electrical signal delivered by a sensor is representative of the sensor's output signal. It may be an output signal from a probe. It may be an analog or digital signal. In one embodiment the probe output signal is analog. The electrical signal to which the transducer is subjected is advantageously the digitized probe output signal. Stated otherwise, an AC/DC converter is interposed between the sensor and the transponder. The use of a digital signal makes it possible to carry out an output temporal multiplexing of the sensor, for example in the case where it is able to measure several physical quantities, as specified previously. The electrical signal is then a digital frame in which the measurements relating to the various physical quantities are temporally multiplexed.

A filter can be interposed between the probe and the transducer so as to filter undesirable components of the probe output signal before injecting the electrical signal onto the transducer.

In the embodiments of FIGS. 2 and 3, the sonar measurement system comprises a single measurement device 20, respectively 200. As a variant, the measurement system comprises a plurality of measurement devices 20, 200 that is to say a plurality of main optical fibers and a plurality of hydrophones 3 and at least one non-acoustic measurement unit 5 that are coupled to said respective main optical fibers. Each main optical fiber is linked to a reader/receiver 7 and to an optical source S, such as described previously. The measurement system comprises either a reader/receiver dedicated to each main fiber or a reader/receiver common to the main optical fibers. The measurement system comprises either an optical source common to each main fiber or optical source dedicated to each main fiber.

Advantageously, the hydrophones and the measurement unit or units are included in an acoustic linear antenna 2. Advantageously, the acoustic and non-acoustic optical fibers as well as the coupler are also included in the non-acoustic linear antenna. The acoustic antenna 2 is linked to the reader/receiver 7 and to the optical source S by means of the main antenna 14 and optionally by means of at least one supply optical fiber such as described previously.

The invention claimed is:

1. A non-acoustic measurement unit intended to be integrated into an all-optical antenna comprising at least one hydrophone, said non-acoustic measurement unit comprising at least one non-acoustic sensor with electrical output able to deliver at least one electrical signal representative of at least one physical quantity, a passive electro-optical transducer subjected to said electrical signal and a portion of an optical fiber intended to convey non-acoustic measurements comprising a first sensitive zone on which said passive electro-optical transducer acts, the passive electro-optical transducer acting on a mechanical constraint undergone by the first sensitive zone in such a way that a value of a measurable property of a first optical signal conveyed by the optical fiber intended to convey non-acoustic measurements is representative of the electrical signal, and at least one photovoltaic cell coupled electrically to said non-acoustic sensor so as to electrically supply said sensor, in which the photovoltaic cell is supplied with optical energy by means of the optical fiber intended to convey non-acoustic measurements.

2. The non-acoustic measurement unit as claimed in claim 1, in which the photovoltaic cell is supplied with optical energy by means of a pump residue arising from the electro-optical transducer.

3. The non-acoustic measurement unit as claimed in claim 1, in which the passive electro-optical transducer is a piezo-electric transducer.

4. The non-acoustic measurement unit as claimed in claim 1, in which the electrical signal is a digital signal.

5. The non-acoustic measurement unit as claimed in claim 1, in which the sensor is able to deliver measurements relating to several physical quantities, the electrical signal being a digital frame in which the measurements relating to the various physical quantities are temporally multiplexed.

6. The non-acoustic measurement unit as claimed in claim 1, in which at least one non-acoustic sensor with electrical output is a heading sensor.

7. A measurement device intended to be integrated into a sonar, comprising:
- at least one measurement unit intended to be integrated into an all-optical antenna, said non-acoustic measurement unit comprising at least one non-acoustic sensor with electrical output able to deliver at least one electrical signal representative of at least one physical quantity, a passive electro-optical transducer subjected to said electrical signal and a portion of an optical fiber intended to convey non-acoustic measurements comprising a first sensitive zone on which said passive electro-optical transducer acts, the passive electro-optical transducer acting on a mechanical constraint undergone by the first sensitive zone in such a way that a value of a measurable property of a first optical signal conveyed by the optical fiber intended to convey non-acoustic measurements is representative of the electrical signal, and at least one photovoltaic cell coupled electrically to said non-acoustic sensor so as to electrically supply said sensor, the optical fiber intended to convey non-acoustic measurements,
- at least one fiber optic hydrophone,
- at least one optical fiber intended to convey acoustic measurements comprising at least one sensitive zone on which at least one of said at least one fiber optic hydrophone acts in such a way that a value of the measurable property of a second optical signal, conveyed by the acoustic optical fiber, is representative of the acoustic pressure measured by said at least one of said at least one fiber optic hydrophone acting on the sensitive zone,
- a main optical fiber coupled optically to optical fiber intended to convey acoustic measurements and to the optical fiber intended to convey non-acoustic measurements in such a way that the main optical fiber conveys said first optical signal and said second optical signal, said first optical signal and said second optical signal being conveyed in a multiplexed manner along main optical fiber, in which the photovoltaic cell is supplied via the main optical fiber.

8. The measurement device as claimed in claim 7, in which the sensitive zones of the optical fiber which is intended to convey acoustic measurements and of the optical fiber which is intended to convey non-acoustic measurements are fiber laser cavities, the measurable property being the wavelength, the first optical signal and the second optical signal being emitted by the sensitive zone of the optical fiber intended to convey non-acoustic measurements and respectively by the sensitive zone of the optical fiber intended to convey acoustic measurements, said sensitive zones being configured in such a way that the wavelengths of the first optical signal and of said second optical signal exhibit different values.

9. The measurement device as claimed in claim 7, in which at least one optical fiber intended to convey acoustic measurements is an optical fiber intended to convey non-acoustic measurements.

10. The measurement device as claimed in claim 7, in which the photovoltaic cell of at least one measurement unit is supplied by means of several so-called supply optical fibers.

11. A measurement system comprising a measurement device as claimed in claim 7, comprising a demultiplexing device comprising at least one optical demultiplexer linked to the main optical fiber receiving said first signal and said second signal and making it possible to isolate the first optical signal and said second optical signal.

12. A measurement device intended to be integrated into a sonar, comprising:
- at least one measurement unit intended to be integrated into an all-optical antenna, said non-acoustic measurement unit comprising at least one non-acoustic sensor with electrical output able to deliver at least one electrical signal representative of at least one physical quantity, a passive electro-optical transducer subjected to said electrical signal and a portion of an optical fiber intended to convey non-acoustic measurements comprising a first sensitive zone on which said passive electro-optical transducer acts, the passive electro-optical transducer acting on a mechanical constraint undergone by the first sensitive zone in such a way that a value of a measurable property of a first optical signal conveyed by the optical fiber intended to convey non-acoustic measurements is representative of the electrical signal, and at least one photovoltaic cell coupled electrically to said non-acoustic sensor so as to electrically supply said sensor, the optical fiber intended to convey non-acoustic measurements,
- at least one fiber optic hydrophone,
- at least one optical fiber intended to convey acoustic measurements comprising at least one sensitive zone on which at least one of said at least one fiber optic hydrophone acts in such a way that a value of the measurable property of a second optical signal, conveyed by the acoustic optical fiber, is representative of the acoustic pressure measured by said at least one of said at least one fiber optic hydrophone acting on the sensitive zone,
- a main optical fiber coupled optically to optical fiber intended to convey acoustic measurements and to the optical fiber intended to convey non-acoustic measurements in such a way that the main optical fiber conveys said first optical signal and said second optical signal, said first optical signal and said second optical signal being conveyed in a multiplexed manner along main optical fiber, in which at least the photovoltaic cell of at least one unit is supplied by an optical fiber intended to convey acoustic measurements.

13. A measurement device intended to be integrated into a sonar, comprising:
- at least one measurement unit intended to be integrated into an all-optical antenna, said non-acoustic measurement unit comprising at least one non-acoustic sensor with electrical output able to deliver at least one electrical signal representative of at least one physical quantity, a passive electro-optical transducer subjected to said electrical signal and a portion of an optical fiber intended to convey non-acoustic measurements comprising a first sensitive zone on which said passive electro-optical transducer acts, the passive electro-optical transducer acting on a mechanical constraint undergone by the first sensitive zone in such a way that a value of a measurable property of a first optical signal conveyed by the optical fiber intended to convey non-acoustic measurements is representative of the electrical signal, and at least one photovoltaic cell coupled electrically to said non-acoustic sensor so as to electrically supply said sensor, the optical fiber intended to convey non-acoustic measurements, at least one fiber optic hydrophone, at least one optical fiber intended to convey acoustic measurements comprising at least one sensitive zone on which at least one of said at least one fiber optic hydrophone acts in such a way that a value of the measurable property of a second optical signal, conveyed by the acoustic optical fiber, is representative of the acoustic pressure measured by said at least one of said at least one fiber optic hydrophone acting on the sensitive zone, a main optical fiber coupled optically to optical fiber intended to convey acoustic measurements and to the optical fiber intended to convey non-acoustic measurements in such a way that the main optical fiber conveys said first optical signal and said second optical signal, said first optical signal and said second optical signal being conveyed in a multiplexed manner along main optical fiber, in which the photovoltaic cell of at least one measurement unit is supplied by the optical fiber intended to convey non-acoustic measurements, on which the transducer of the measurement unit acts.

14. A measurement device intended to be integrated into a sonar, comprising:

at least one measurement unit intended to be integrated into an all-optical antenna, said non-acoustic measurement unit comprising at least one non-acoustic sensor with electrical output able to deliver at least one electrical signal representative of at least one physical quantity, a passive electro-optical transducer subjected to said electrical signal and a portion of an optical fiber intended to convey non-acoustic measurements comprising a first sensitive zone on which said passive electro-optical transducer acts, the passive electro-optical transducer acting on a mechanical constraint undergone by the first sensitive zone in such a way that a value of a measurable property of a first optical signal conveyed by the optical fiber intended to convey non-acoustic measurements is representative of the electrical signal, and at least one photovoltaic cell coupled electrically to said non-acoustic sensor so as to electrically supply said sensor, the optical fiber intended to convey non-acoustic measurements, at least one fiber optic hydrophone, at least one optical fiber intended to convey acoustic measurements comprising at least one sensitive zone on which at least one of said at least one fiber optic hydrophone acts in such a way that a value of the measurable property of a second optical signal, conveyed by the acoustic optical fiber, is representative of the acoustic pressure measured by said at least one of said at least one fiber optic hydrophone acting on the sensitive zone, a main optical fiber coupled optically to optical fiber intended to convey acoustic measurements and to the optical fiber intended to convey non-acoustic measurements in such a way that the main optical fiber conveys said first optical signal and said second optical signal, said first optical signal and said second optical signal being conveyed in a multiplexed manner along main optical fiber, in which the photovoltaic cell of at least one measurement unit is supplied by a supply optical fiber distinct from the optical fiber intended to convey acoustic measurements and from the optical fiber intended to convey non-acoustic measurements, said supply optical fiber being coupled optically to an optical coupler ensuring a coupling between the main optical fiber and the optical fiber intended to convey acoustic measurements and the optical fiber intended to convey non-acoustic measurements.

* * * * *